United States Patent
Helfrecht et al.

(10) Patent No.: US 12,366,655 B2
(45) Date of Patent: Jul. 22, 2025

(54) REPROGRAMMABLE RADAR SYSTEM AND METHOD

(71) Applicant: Rockwell Collins, Inc., Cedar Rapids, IA (US)

(72) Inventors: Brian O. Helfrecht, Batavia, IL (US); Luca Manica, Trento (IT); Carlo L. Tiana, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 447 days.

(21) Appl. No.: 17/746,445

(22) Filed: May 17, 2022

(65) Prior Publication Data
US 2023/0375699 A1    Nov. 23, 2023

(51) Int. Cl.
*G01S 13/933* (2020.01)
*G01S 13/89* (2006.01)
*G01S 13/95* (2006.01)

(52) U.S. Cl.
CPC ............ *G01S 13/953* (2013.01); *G01S 13/89* (2013.01); *G01S 13/933* (2020.01)

(58) Field of Classification Search
CPC ....... G06Q 50/10; G01S 13/72; G01S 13/953; G01S 13/89; G01S 13/933; G01S 13/91;
(Continued)

(56) References Cited

U.S. PATENT DOCUMENTS 5,497,157 A    3/1996  Gruener et al.
8,026,841 B2   9/2011  Liu et al.
(Continued)

FOREIGN PATENT DOCUMENTS

EP    3339883 A1    6/2018
EP    3477331 A1    5/2019
(Continued)

OTHER PUBLICATIONS

A. Cheredachuk, et al. "Adaptive Algorithm for Radar-System Parameters Tuning by means of Motion Zone Estimation," 2020 IEEE 3rd International Conference on Data Stream Mining & processing (DSMP), Aug. 21-25, 2020, Lviv, Ukraine. URL: https://ieeexplore.ieee.org/document/9204155.
(Continued)

*Primary Examiner* — Vladimir Magloire
*Assistant Examiner* — Bongani Jabulani Mashele
(74) *Attorney, Agent, or Firm* — Suiter Swantz IP (57) ABSTRACT

A system including a radar system. The radar system may include a transmit antenna, a receive antenna, and a controller. The controller may be configured to: determine or obtain information indicative of at least one of a phase of flight or an environmental condition; determine or obtain information indicative of a mission associated with the determined phase of flight and/or environmental condition; and based at least on the determined mission and the determined phase of flight and/or the environmental condition, tune radar parameters of the radar system to values to fulfill the determined mission associated with the determined phase of flight and/or environmental condition. The radar system may be reprogrammable by tuning the radar parameters to operate over any of a collection of phases of flight, any of a collection of environmental conditions, and any of a collection of missions.

15 Claims, 9 Drawing Sheets

(58) Field of Classification Search
CPC .... G01S 2013/916; G01S 13/02; G01S 13/34; G01S 13/58; G01S 13/913; G01S 2013/0272; G01S 7/35; G01S 13/10; G01S 13/44; G01S 13/934; G01S 13/935; G01S 7/28; B64D 43/00
See application file for complete search history.

(56) References Cited

U.S. PATENT DOCUMENTS

| | | | |
|---|---|---|---|
| 9,128,189 | B1 | 9/2015 | West et al. |
| 9,194,946 | B1 * | 11/2015 | Vacanti .................. G01S 13/286 |
| 9,635,508 | B2 | 4/2017 | Martone et al. |
| 10,228,460 | B1 | 3/2019 | Jinkins et al. |
| 10,324,166 | B2 | 6/2019 | West et al. |
| 10,788,569 | B2 * | 9/2020 | Lin ........................ G01S 7/0233 |
| 10,921,422 | B2 | 2/2021 | Smith et al. |
| 11,079,489 | B2 | 8/2021 | Surace |
| 11,143,756 | B2 | 10/2021 | Vacanti |
| 2017/0090011 | A1 * | 3/2017 | West ..................... G01S 13/426 |
| 2019/0044551 | A1 * | 2/2019 | Dinc ..................... H04B 1/0082 |
| 2020/0271777 | A1 | 8/2020 | Vacanti et al. |
| 2021/0286050 | A1 | 9/2021 | Achour et al. |

FOREIGN PATENT DOCUMENTS

| | | | |
|---|---|---|---|
| IN | 5723CHENP2007 A | 12/2007 | |
| KR | 20180070130 A * | 6/2018 | ............. G06Q 50/10 |

OTHER PUBLICATIONS

Alon, Y. and Ulmer, L., "94 Ghz MMW Imaging Radar System," SAE Technical Paper 912208, 1991, https://doi.org/10.4271/912208. Retrieve from.

Brooker, Graham & Carter, Tim. (2000). A Millimetre Wave Radar Sensor for Autonomous Navigation and Landing.

H. Kim and N. A. Goodman, "Waveform design by task specific information," in Proc. IEEE Radar Conf., 2010, pp. 848-852.

J. R. Guerci, R. M. Guerci, M. Ranagaswamy, J. S. Bergin, and M. C.Wicks, "CoFAR: Cognitive fully adaptive radar," in Proc. IEEE Radar Conf.,May 2014, pp. 984-989.

R. Oechslin et al. "Cognitive radar parameter optimization in a congested spectrum environment," 2018 IEEE Radar Conference, Apr. 23-27, 2018, Oklahoma City, OK, USA. URL: https://ieeexplore.ieee.org/document/8378560.

S. Zubeyde et al. "An overview of cognitive radar: past present and future," Aerospace and Electronic Systems Magazine IEEE, vol. 34, No. 12, pp. 6-18, 2019. URL: https://ieeexplore.ieee.org/document/8961364.

Extended European Search Report dated Sep. 27, 2023; European Application No. 23174103.4.

R. Thaens, et al. "Mission-based radar optimisation via Automated Scenario Recognition" 2018 19th International Radar Symposium (IRS), German Institute of Navigation—DGON, Jun. 20, 2018, pp. 1-10.

* cited by examiner

FIG.1

| Routing Phase | Functionality | Description |
|---|---|---|
| Landing | Radar Image | The system provides an image of the landing zone using the echoes coming from the scene. |
| Landing | Landing zone alignment | Using the radar image, the system detects the lights of the ALS and provides information to the pilot to align the aircraft with the landing zone. |
| Landing | Detect and avoidance | The system searches in the space surrounding the aircraft any possible threats, e.g. birds, UAVs, and electrical cables. |
| Taxi | Taxiway clearance | The system looks for other vehicles on the taxiway |
| Take-off | Taxiway clearance | The system looks for other vehicles on the taxiway-takeoff zone |
| Take-off | Detect and avoidance | The system searches in the space surrounding the aircraft any possible threats, e.g. birds, UAVs, and electrical cables. |

FIG.2

| Parameter | Range Resolution | Maximal Range | Speed Resolution | Maximal Speed | $T_p$ Processing Time |
|---|---|---|---|---|---|
| $B_c$ | X | X | | | |
| $T_c$ | X | X | X | X | |
| $f_s$ | | X | | | |
| $P_{TX}$ | | X | | | |
| $f_c$ | | | X | X | |
| $N_c (T_f = N \cdot T_c)$ | | X | X | | X |
| $N_s$ | | X | | | X |
| $FOR_{el}, FOR_{az}$ | | | | | X |

$B_c$ : Chirp bandwidth
$T_c$ : Chirp period
$f_s$ : ADC sampling frequency
$P_{TX}$ : Transmitted power
$f_c$ : Chirp central frequency
$N_c$ : Number of chirps in frame
$T_f$ : Frame time
$N_s$ : Transmitted power
$FOR_{el}, FOR_{az}$ : Field of regard in elevation and azimuth

REPROGRAMMABLE RADAR SYSTEM AND METHOD

BACKGROUND

Currently, millimeter (mm) wave frequency-modulated continuous-wave radars for aircraft, such as commercial aircraft and unmanned aerial vehicles (UAVs), have conflicting operational requirements for different functions, such as assisted landing, cable warning, and sense and avoid. Currently, radar systems have a single fixed configuration for performing one function; such current radar systems perform sub-optimally for non-configured functions, and operational optimality requires installation of multiple different radar systems to perform all desired functions. Installing multiple radar systems adds to size, weight, and complexity of aircraft and cost for installation.

SUMMARY

In one aspect, embodiments of the inventive concepts disclosed herein are directed to a system. The system may include a radar system. The radar system may include a transmit antenna and a receive antenna. The radar system may include a controller communicatively coupled to the transmit antenna and the receive antenna. The controller may be configured to: determine or obtain information indicative of at least one of a phase of flight or an environmental condition; determine or obtain information indicative of a mission associated with the determined phase of flight and/or environmental condition; and based at least on the determined mission and the determined phase of flight and/or the environmental condition, tune radar parameters of the radar system to values to fulfill the determined mission associated with the determined phase of flight and/or environmental condition. The radar system may be reprogrammable by tuning the radar parameters to operate over any of a collection of phases of flight, any of a collection of environmental conditions, and any of a collection of missions.

In a further aspect, embodiments of the inventive concepts disclosed herein are directed to a method. The method may include: determining or obtaining, by a controller of a radar system, information indicative of at least one of a phase of flight or an environmental condition, wherein the controller is communicatively coupled to a transmit antenna and a receive antenna; determining or obtaining, by the controller, information indicative of a mission associated with the determined phase of flight and/or environmental condition; and based at least on the determined mission and the determined phase of flight and/or the environmental condition, tuning, by the controller, radar parameters of the radar system to values to fulfill the determined mission associated with the determined phase of flight and/or environmental condition. The radar system may be reprogrammable by tuning the radar parameters to operate over any of a collection of phases of flight, any of a collection of environmental conditions, and any of a collection of missions.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following:

A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a method and a system (e.g., an aircraft system) including a radar system (e.g., a software-defined radar system) that is reprogrammable by tuning radar parameters to operate over any of a collection of phases of flight, any of a collection of environmental conditions, and any of a collection of missions.

Some embodiments may include an adaptive, context aware beam scanning algorithm to be deployed on FMCW and/or pulsed radar systems, such as designed for assisted landing. For example, at different phases of flight (e.g., landing, taxi, take-off), for different missions (e.g., runway imaging, DAA, taxiway clearance, etc.), and for different environmental conditions (e.g., rain, terrain topology), the beam scan parameters (e.g. radar field of view (FOV), number of scans, etc.), the waveform parameters (e.g., chirp time, bandwidth, and chirps per frame), as well as the transmitted power may be properly tailored to fulfill operational requirements. Information about the airport map may also be included to improve radar detection performance (e.g., to exclude echoes from surrounding buildings or to reduce clutter impact).

Some embodiments may adapt and optimize performance of a single radar system in different working conditions to match functionality of a non-adaptive, multi-radar-system implementation. In some embodiments, a single radar system may satisfy different (and sometimes, otherwise conflicting) operating requirements leading to reduced costs, smaller installation space, and lower weight compared to a multi-radar-system implementation.

Figure 1:
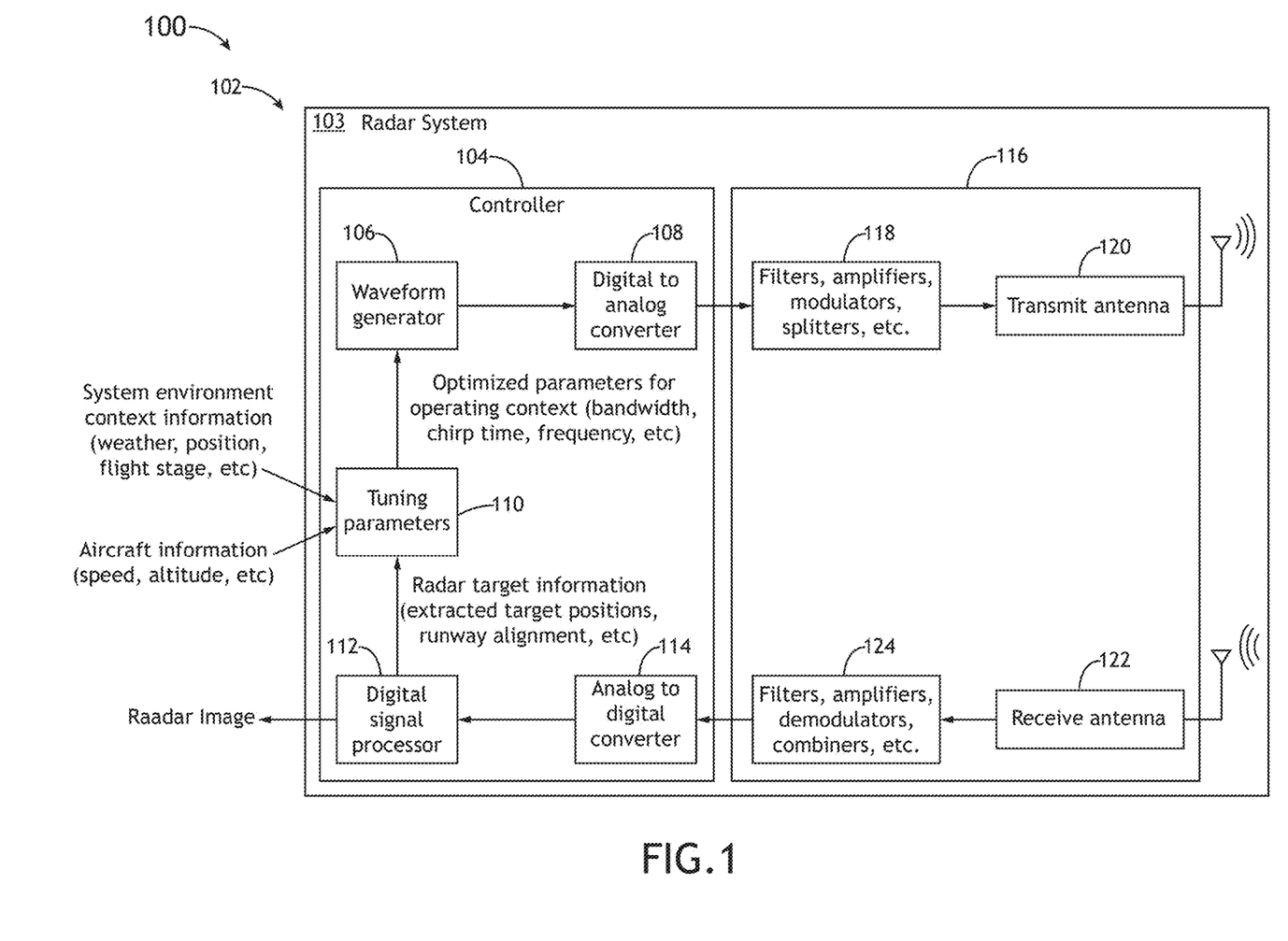
FIG. 1 is a view of an exemplary embodiment of a system according to the inventive concepts disclosed herein.

Referring now to FIG. 1, an exemplary embodiment of a system 100 according to the inventive concepts disclosed herein is depicted. In some embodiments, the system 100 may include an aircraft 102. The aircraft may include a radar system 103.

The radar system 103 may be a software-defined radar system, such as a cognitive software-defined radar system. The radar system 103 may be reprogrammable by tuning radar parameters to operate over any of a collection of phases of flight, any of a collection of environmental conditions, and/or any of a collection of missions (e.g., functionalities). The radar system 103 may include at least one controller 104 and transmit/receive components 116, some or all of which may be communicatively coupled at any given time.

The at least one controller 104 may be or may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform, if more than one) any of the operations disclosed throughout. For example, the controller 104 may be an FPGA. The at least one controller 104 may include at least one waveform generator 106 and/or waveform generator circuitry, which may be digital and/or analog. The at least one controller 104 may include at least one digital-to-analog converter (DAC) 108. The at least one controller 104 may include at least one analog-to-digital converter (ADC) 114. The at least one controller 104 may include at least one digital signal processor (DSP) 112 and/or digital signal processor circuitry. The at least one controller 104 may include circuitry 110 configured to perform a method of tuning radar parameters, as disclosed throughout.

The DSP 112 may be configured to: receive digital radar echo signals from the transmit/receive components 116; output radar images; and/or output radar target information (e.g., which may be extracted from target positions, runway alignment, and/or etc.) to circuitry 110. The circuitry 110 may be configured to: perform a method of tuning radar parameters; receive radar target information from the DSP 112; receive aircraft information (e.g., speed, altitude, and/or etc.) from at least one onboard aircraft computing device, such as a flight management system (FMS) computing device (not shown) and/or a global positioning system (GPS) computing device (not shown); receive system environment context information (e.g., weather, position, flight stage, and/or etc.) from the at least one onboard aircraft computing device, such as a flight management system (FMS) computing device (not shown) and/or a global positioning system (GPS) computing device (not shown); and/or output, to the waveform generator 106, optimized radar parameters for operating context (e.g., bandwidth, chirp time, frequency, and/or etc.).

The transmit/receive components 116 (e.g., which may include analog and/or digital circuitry) may include transmit-side components 118, at least one transmit antenna 116 (e.g., an electronically scanned array (ESA) antenna), receive-side components 124, and/or at least one receive antenna 122 (e.g., an ESA antenna), some or all of which may be communicatively coupled at any given time. The receive-side components 124 may include filters, amplifiers, demodulators, splitters, and/or etc. The transmit-side components 118 may include filters, amplifiers, modulators, splitters, and/or etc.

In some embodiments, the at least one controller 104 may be configured to perform (e.g., collectively perform, if more than one controller) any or all of the operations disclosed throughout. For example, the at least one controller 104 may be configured to: determine or obtain information indicative of at least one of a phase of flight or an environmental condition; determine or obtain information indicative of a mission associated with the determined phase of flight and/or environmental condition; and/or based at least on the determined mission and the determined phase of flight and/or the environmental condition, tune radar parameters of the radar system to values to fulfill the determined mission associated with the determined phase of flight and/or environmental condition. The radar system 103 may be reprogrammable by tuning the radar parameters to operate over any of a collection of phases of flight, any of a collection of environmental conditions, and any of a collection of missions.

In some embodiments, the radar system 103 may be reprogrammable to operate as a continuous-wave (CW) radar (e.g., an FMCW radar) in a first programmed state and to operate as a pulsed radar in a second programmed state. In some embodiments, the type of radar may be changed rapidly from pulsed, to FMCW, in real time to optimally accomplish missions in a time-sliced manner.

In some embodiments, the radar parameters may include at least one of: chirp bandwidth, chirp period, analog-to-digital (ADC) converter sampling frequency, at least one transmitted power, chirp central frequency, number of chirps in a frame, frame time, field of regard (FOR) in elevation, and/or FOR in azimuth.

In some embodiments, the collection of phases of flight may include at least two of a landing phase, a taxi phase, or a take-off phase.

For example, the collection of phases of flight may includes the landing phase. The determined phase of flight and/or environmental condition may include the landing phase. The collection of missions may include radar imaging, landing zone alignment, and detect and avoidance (DAA). The determined mission may further include the radar imaging, the landing zone alignment, or the detect and avoidance (DAA). In one example, the radar system 103 may be reprogrammed by tuning the radar parameters to operate over a subsequent determined phase of flight and/or environmental condition, wherein the subsequent determined phase of flight and/or environmental condition is different from the determined phase of flight and/or environmental condition. In another example, the determined mission comprises the radar imaging. The radar system 103 may be reprogrammed by tuning the radar parameters to operate over a first subsequent determined mission, the first subsequent determined mission including the landing zone alignment. At a different time, the radar system 103 may be reprogrammed by tuning the radar parameters or radar type (e.g., Pulsed, FMWC, etc.) to operate over a second subsequent determined mission, the second subsequent determined mission comprising the DAA. At a different time, the radar system 103 may be reprogrammed by tuning the radar parameters to operate over a subsequent determined phase of flight and/or environmental condition, wherein the subsequent determined phase of flight and/or environmental condition includes the taxi phase. At a different time, the radar system 103 may be reprogrammed by tuning the radar parameters to operate over a third subsequent determined mission, the third subsequent determined mission including taxiway clearance. At a different time, the radar system 103 may be reprogrammed by tuning the radar parameters to operate over a second subsequent determined phase of flight and/or environmental condition, wherein the second subsequent determined phase of flight and/or environmental condition includes the take-off phase. At a different time, the radar system 103 may be reprogrammed by tuning the radar parameters to operate over a fourth subsequent determined mission, the fourth subsequent determined mission comprising the DAA.

In some embodiments, the collection of phases of flight includes the taxi phase, wherein the determined phase of flight and/or environmental condition includes the taxi phase, wherein the collection of missions includes taxiway clearance, wherein the determined mission further comprises the taxiway clearance. For example, the radar bandwidth may be optimized to tradeoff range for range resolution in order to detect foreign objects or obstacles on the taxiway or runway. For example, the radar system may be reprogrammed by tuning the radar parameters to operate over a subsequent determined phase of flight and/or environmental condition, the subsequent determined phase of flight and/or environmental condition being different from the determined phase of flight and/or environmental condition.

In some embodiments, the collection of phases of flight includes the take-off phase, wherein the determined phase of flight and/or environmental condition includes the take-off phase, wherein the collection of missions includes taxiway clearance and detect and avoidance (DAA), wherein the determined mission further includes the taxiway clearance or the detect and avoidance (DAA).

In some embodiments, the radar system 103 may be reprogrammed by tuning the radar parameters to operate over a subsequent determined phase of flight and/or environmental condition, the subsequent determined phase of flight and/or environmental condition being different from the determined phase of flight and/or environmental condition.

In some embodiments, the collection of environmental conditions may include at least one of rain, snow, sleet, fog, hail, lightning, dust, and/or sand.

Figure 2:
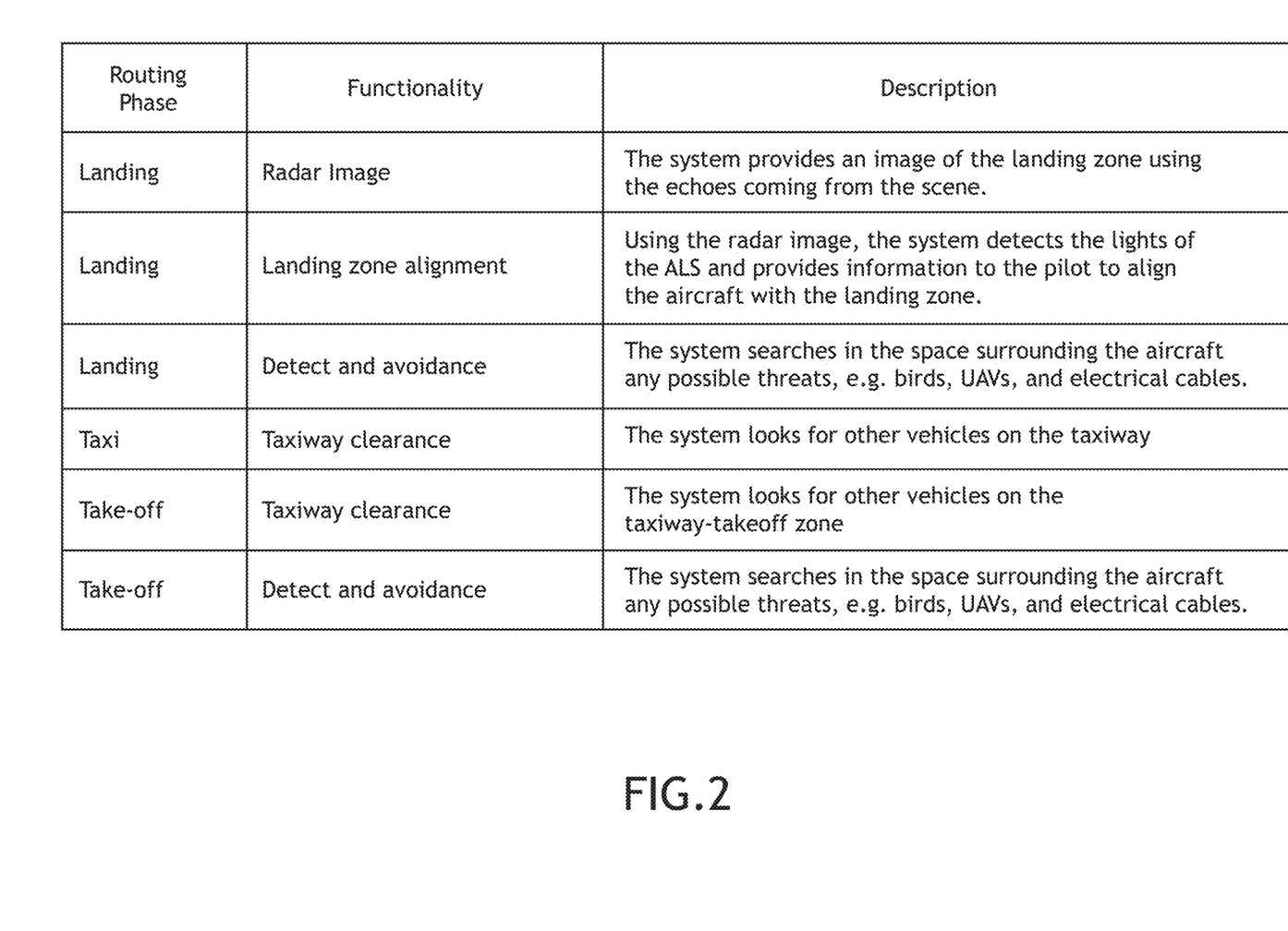
FIG. 2 is an exemplary table of phases of flight (e.g., routing phases) and missions (e.g., functionalities) according to the inventive concepts disclosed herein.

Referring now to FIG. 2, an exemplary table of phases of flight (e.g., routing phases) and missions (e.g., functionalities) according to the inventive concepts disclosed herein is depicted. However, currently, a single non-reprogrammable radar system is not capable of meeting all of the requirements of performing a collection of missions, because many of the missions have conflicting requirements. In some embodiments, the radar system 103 is reprogrammable such that the radar system can be adaptively adjusted to meet otherwise conflicting radar parameter requirements associated with various missions.

For example, the landing phase of fight may have an associated mission of radar imaging. The radar system 103 may provide an image of a landing zone using radar echoes coming from a scene. For the radar imaging, the detection range may be a few kilometers. The range resolution may be in the order of few meters. The landing zone may be fully illuminated by a field of view (FOV) of a few degrees. The system should provide a real time image to a pilot.

For example, the landing phase of fight may have an associated mission of landing zone alignment. Using a radar image, the radar system 103 may detect the lights of the approach lighting system (ALS) and provide information to a pilot to align the aircraft with a landing zone. The information should be provided in real time to the pilot. The alignment may start a few kilometers away from the touchdown zone and have a FOV of few degrees. Range resolution may be in the order of few meters.

For example, the landing phase of fight may have an associated mission of DAA. The radar system 103 may search in the space surrounding the aircraft 102 for any possible threats, e.g., birds, unmanned aerial vehicles (UAVs), and electrical cables. The mission may need a full volumetric scan (over all of the radar's FOV) to detect any obstacles or threats. Detection range may be as much as possible.

For example, the taxi phase of fight may have an associated mission of taxiway clearance. The radar system 103 may look for other vehicles on the taxiway. The detection range may be a few hundred meters. FOV only needs to be on a single azimuth plane (e.g., constant elevation).

For example, the take-off phase of fight may have an associated mission of taxiway clearance. The radar system 103 may look for other vehicles on the taxiway in the takeoff zone. The detection range may be a few hundred meters. FOV only needs to be on a single azimuth plane (e.g., constant elevation).

For example, the take-off phase of fight may have an associated mission of DAA. The radar system 103 may search in the space surrounding the aircraft 102 for any possible threats, e.g., birds, unmanned aerial vehicles (UAVs), and electrical cables. The mission may need only a half volumetric scan (over upper hemisphere) to detect any obstacles or threats. Detection range may be as much as possible.

Figure 3:
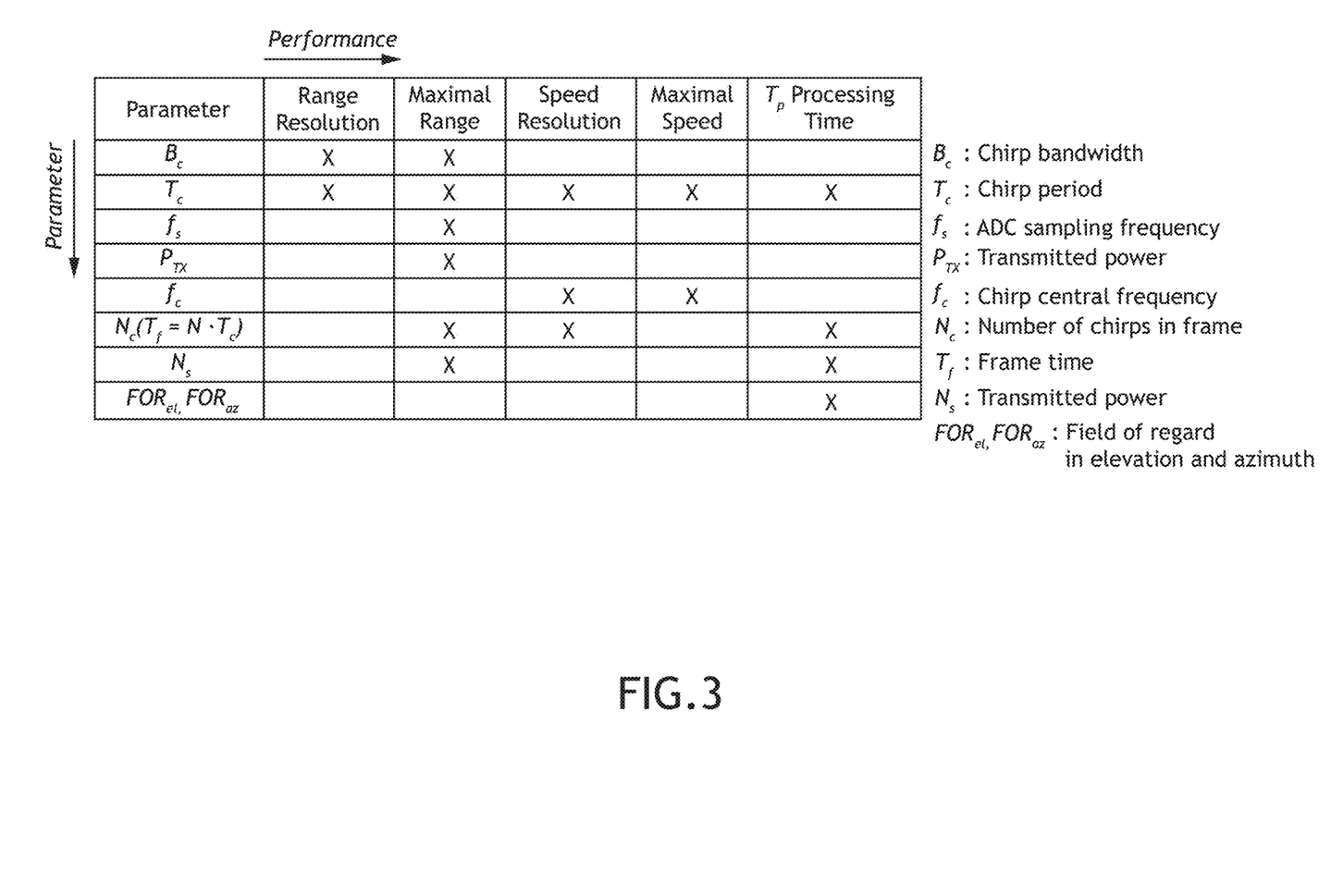
FIG. 3 is an exemplary table of radar parameters and the performance metrics that the radar parameters affect according to the inventive concepts disclosed herein.

Referring now to FIG. 3, an exemplary table of radar parameters and the performance metrics that the radar parameters affect according to the inventive concepts disclosed herein is depicted. The radar parameters may include: chirp bandwidth, chirp period, ADC sampling frequency, transmitted power, chirp central frequency, number of chirps in a frame, frame time, transmitted power, and/or fields of regard in elevation and azimuth. The radar parameters may affect performance metrics including: range resolution maximal range, speed resolution, maximal speed, and/or processing time (e.g., processing time needed for executing a radar function, such as to get updated radar information (e.g., radar image, target speed, and range)).

Figure 4:
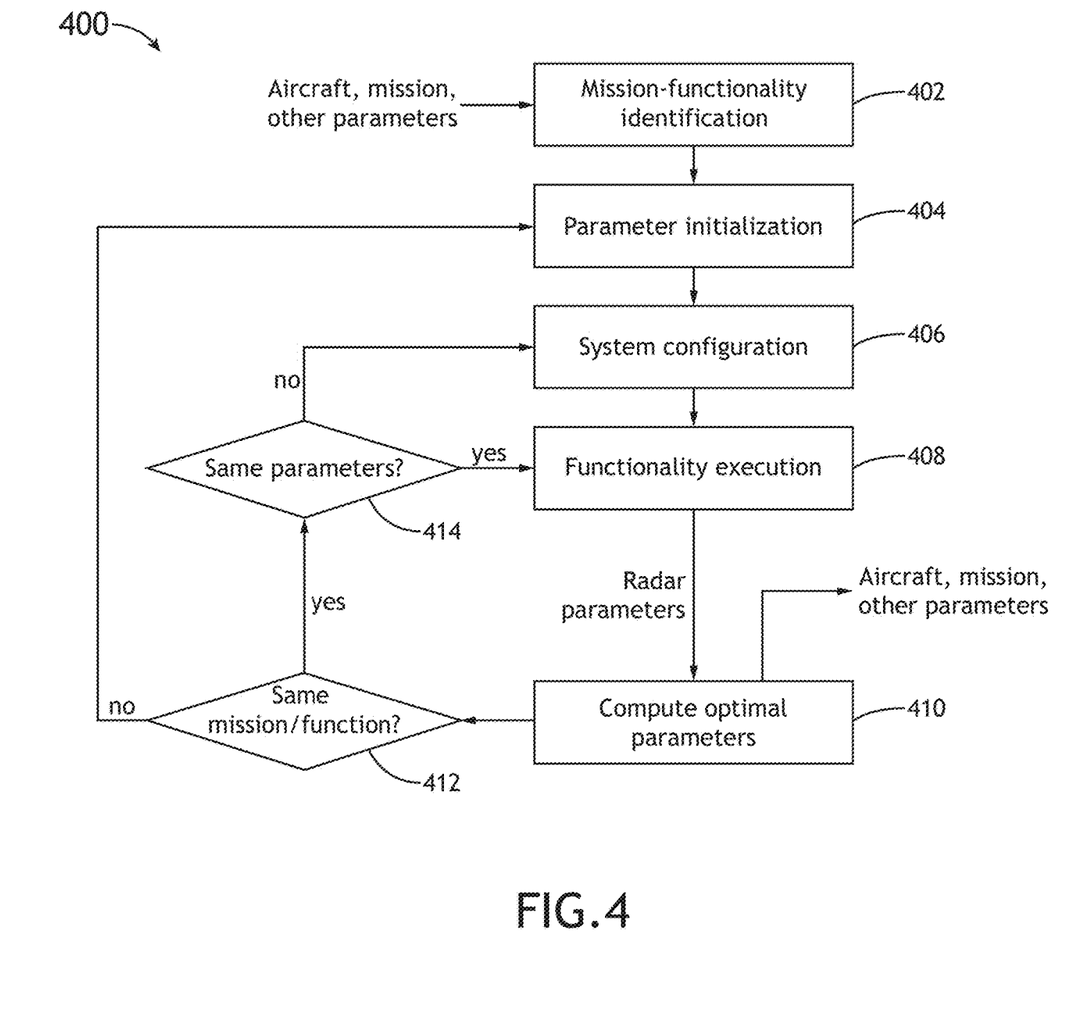
FIG. 4 is a diagram of an exemplary embodiment of a method according to the inventive concepts disclosed herein.

Referring now to FIG. 4, an exemplary embodiment of a method 400 for tuning the radar parameters according to the inventive concepts disclosed herein may include one or more of the following steps. Additionally, for example, some embodiments may include performing one or more instances of the method 400 iteratively, concurrently, and/or sequentially. Additionally, for example, at least some of the steps of the method 400 may be performed in parallel and/or concurrently. Additionally, in some embodiments, at least some of the steps of the method 400 may be performed non-sequentially.

Tuning parameters for tuning the radar system 103 may include aircraft parameters, mission parameters, radar parameters, and other parameters.

Aircraft parameters may include information obtained from other aircraft systems. For example, aircraft parameters may include GPS position and/or altitude, orientation angles (e.g., yaw, pitch, and/or roll), airspeed, ground speed, and/or aircraft mode (e.g., taxi, take-off, or landing assist).

Mission parameters may include information related to a system's 100 operational goal. For example, the mission parameters may include a radar mode (e.g., imaging, runway alignment, and/or target detection/identification) and/or aircraft mode (e.g., taxi, take-off, or landing assist).

Radar parameters may include information obtained directly from the radar system 103. For example, the radar parameters may include target ranges, positions, and velocities; types of targets; and/or target images.

Other parameters may include information that may be used to provide operating context to the system 100. For example, the other parameters may include airport and/or region maps, approach lighting system (ALS) configuration, and/or current weather conditions.

Referring still to FIG. 4, the method 400 may include various steps.

A step 402 may include mission (e.g., functionality) identification. The identification may be manual or automatic.

A step 404 may include parameter initialization to initialize the radar parameters to some default state with nominal performance.

A step 406 may include system configuration to configure software and/or hardware components with selected radar parameters.

A step 408 may include functionality execution to collect data within the system 100.

A step 410 may include computing optimal radar parameters by using information provided by the radar system 103, the aircraft 102, a user, the environment, and/or etc.

A step 412 may include determining whether the computed optimal radar parameters are for the same mission (e.g., functionality). If the computed optimal radar parameters are not for the same mission, then the step 404 may be repeated.

If the computed optimal radar parameters are for the same mission, a step 414 may include determining whether the computed optimal radar parameters are the same. If the computed optimal radar parameters are not the same, the step 406 may be repeated. If the computed optimal radar parameters are the same, the step 408 may be repeated.

Further, the method 400 may include any of the operations disclosed throughout.

Figure 5A:
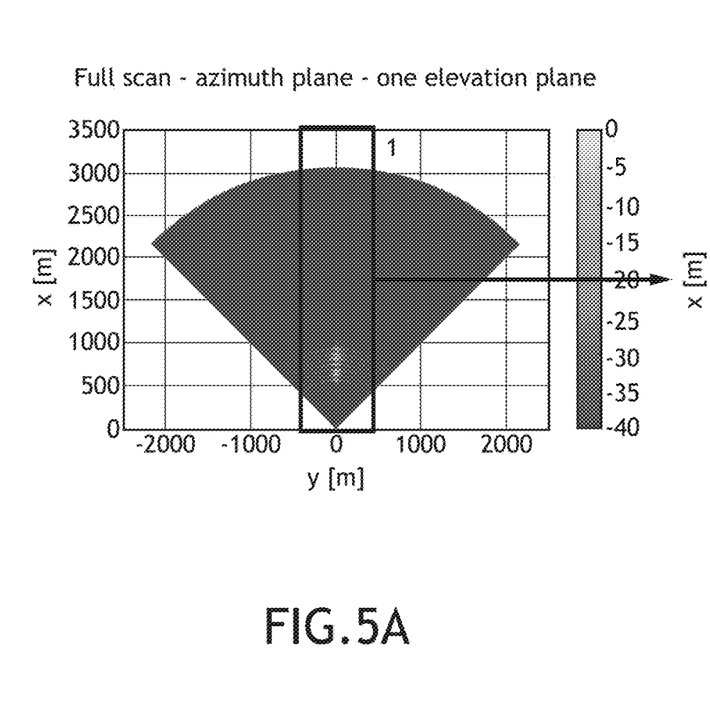
FIGS. 5A, 5B, and 5C depict an exemplary embodiment showing a radar scan using adaptive beam scanning for an example scenario where a landing aircraft is approaching a runway according to the inventive concepts disclosed herein.
Figure 5B:
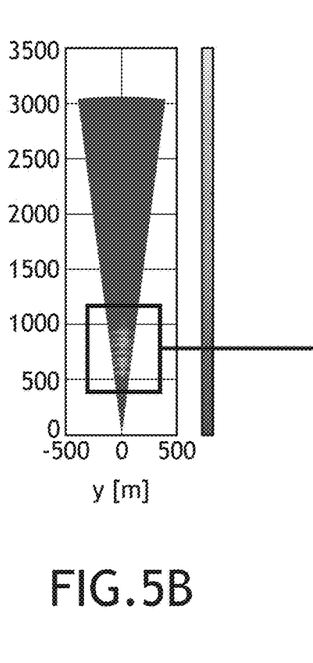
Figure 5C:
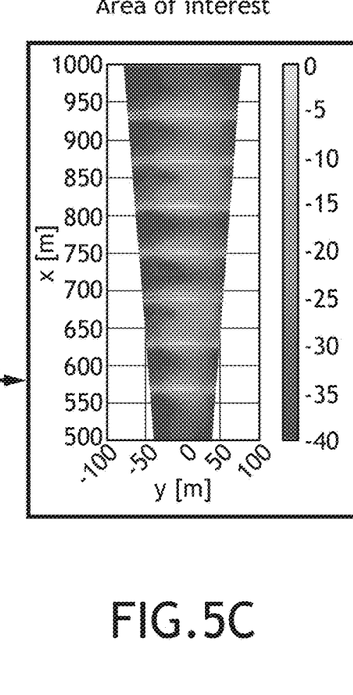

Referring now to FIGS. 5A, 5B, and 5C, an exemplary embodiment showing a radar scan using adaptive beam scanning for an example scenario where a landing aircraft is approaching a runway according to the inventive concepts disclosed herein is shown. The radar system 103 may image runway lights. The adaptive beam scanning may only scan where targets of interest (e.g., light barrettes) are present. FIG. 5A shows a full scan in a single azimuth plane (e.g., one elevation plane). FIG. 5B shows adaptive beam scanning over a focused field of regard in the azimuth to focus on the location of the targets of interest. FIG. 5C shows adaptive beam scanning over a focused ranged to focus on a range of the location of the targets of interest within the focused field of regard in the azimuth. For example, the same information for the targets of interest can be acquired by reducing the beam scan from [−45 degrees; 45 degrees] and 3,000 meter range to [−4.5 degrees; 4.5 degrees] and 1,000 meter range. Such adaptive beam scanning for this example improves scanning speed by ten-fold, and reducing the scanning angle on the elevation plane can increase the scanning speed further.

Adaptive beam scanning can be used for detecting runway lights, as well as many other use cases. Such other use cases may include (but are not limited to): imaging airports and/or other regions as a whole; DAA for obstacles (e.g., drones, birds, cables, other aircraft, and/or airport machinery); and/or other airport features (e.g., signage, vehicles, ground cover (e.g., pavement vs. grass, etc.)).

Figure 6:
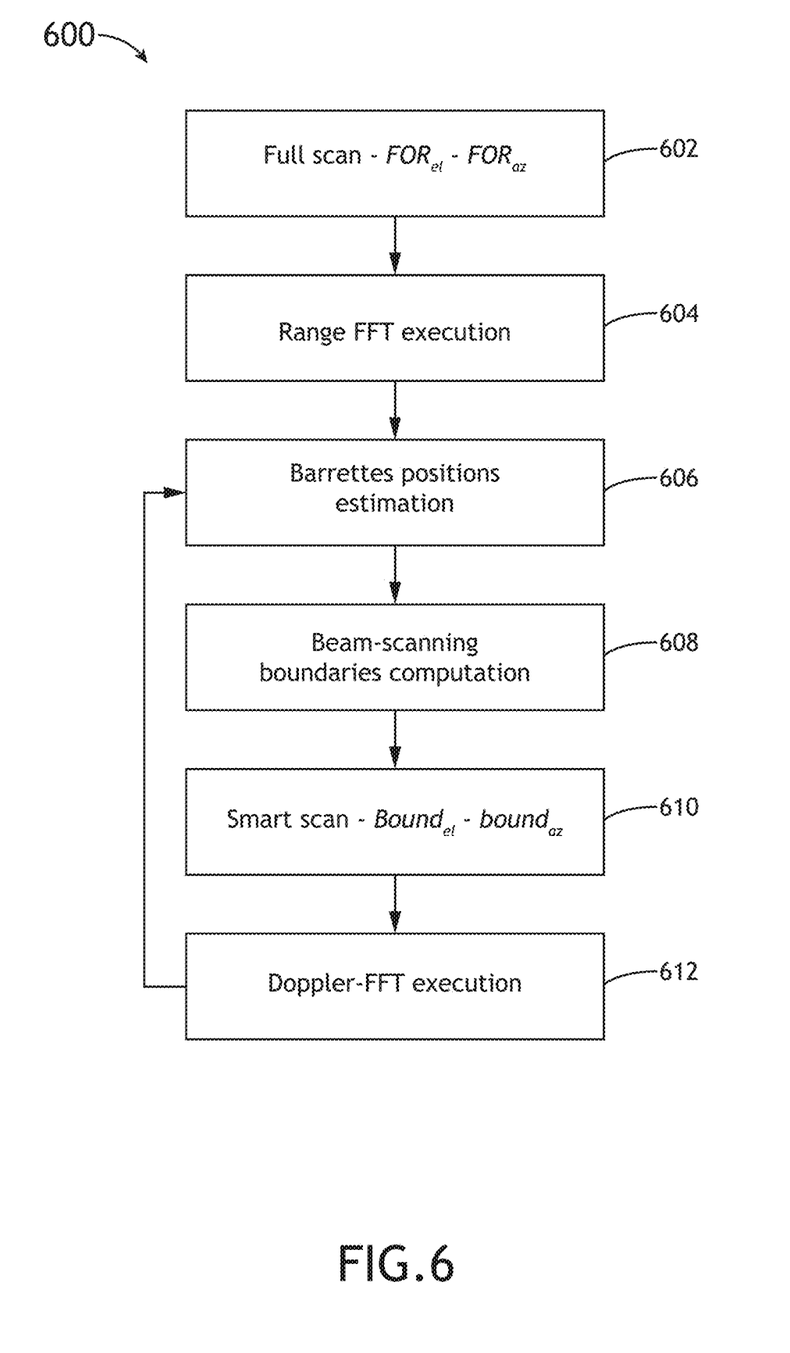
FIG. 6 is a diagram of an exemplary embodiment of a method according to the inventive concepts disclosed herein.

Referring now to FIG. 6, an exemplary embodiment of a method 600 for adaptive scanning according to the inventive concepts disclosed herein may include one or more of the following steps. Additionally, for example, some embodiments may include performing one or more instances of the method 600 iteratively, concurrently, and/or sequentially. Additionally, for example, at least some of the steps of the method 600 may be performed in parallel and/or concurrently. Additionally, in some embodiments, at least some of the steps of the method 600 may be performed non-sequentially.

A step 602 may include performing a full volumetric scan over the FORs in the azimuth and elevation using a small number of chirps (e.g., fast scanning).

A step 604 may include acquiring and storing data and executing a range fast Fourier transform (FFT) (e.g., targets position (e.g., lights position) computation, such as for an example use case of detecting landing light positions).

A step 606 may include providing rough position estimation for targets (e.g., ALS barrettes for the example use case of detecting landing light positions). This step may include setting a threshold and considering cells higher than the threshold.

A step 608 may include computing new boundaries of beam scanning from the estimated positions from the step 606.

Steps 610 and 612 may collectively include performing a beam scan using new scan boundaries using multiple chirps, which may allow speed estimation, interference mitigation, more collected power, and/or a higher signal-to-noise ratio (SNR) for the radar system 103.

Further, the method 600 may include any of the operations disclosed throughout.

Figure 7A:
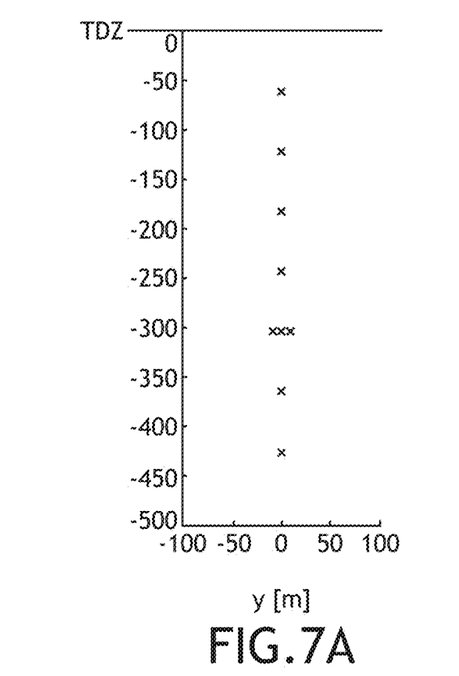
FIGS. 7A, 7B, 7C, and 7D depict an exemplary embodiment showing an exemplary adaptive beam scanning benefit for an example scenario where a landing aircraft is approaching a runway according to the inventive concepts disclosed herein.
Figure 7B:
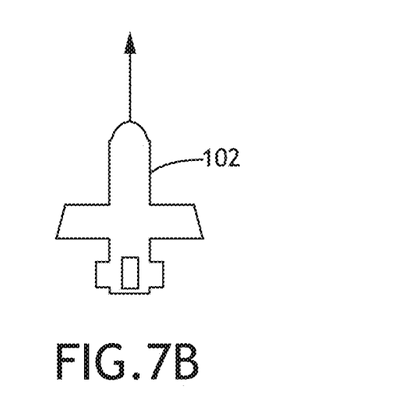
Figure 7C:
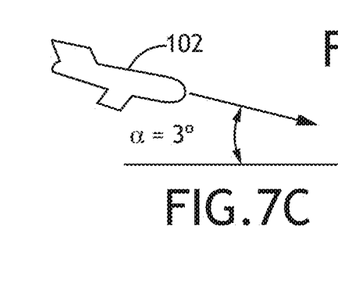
Figure 7D:
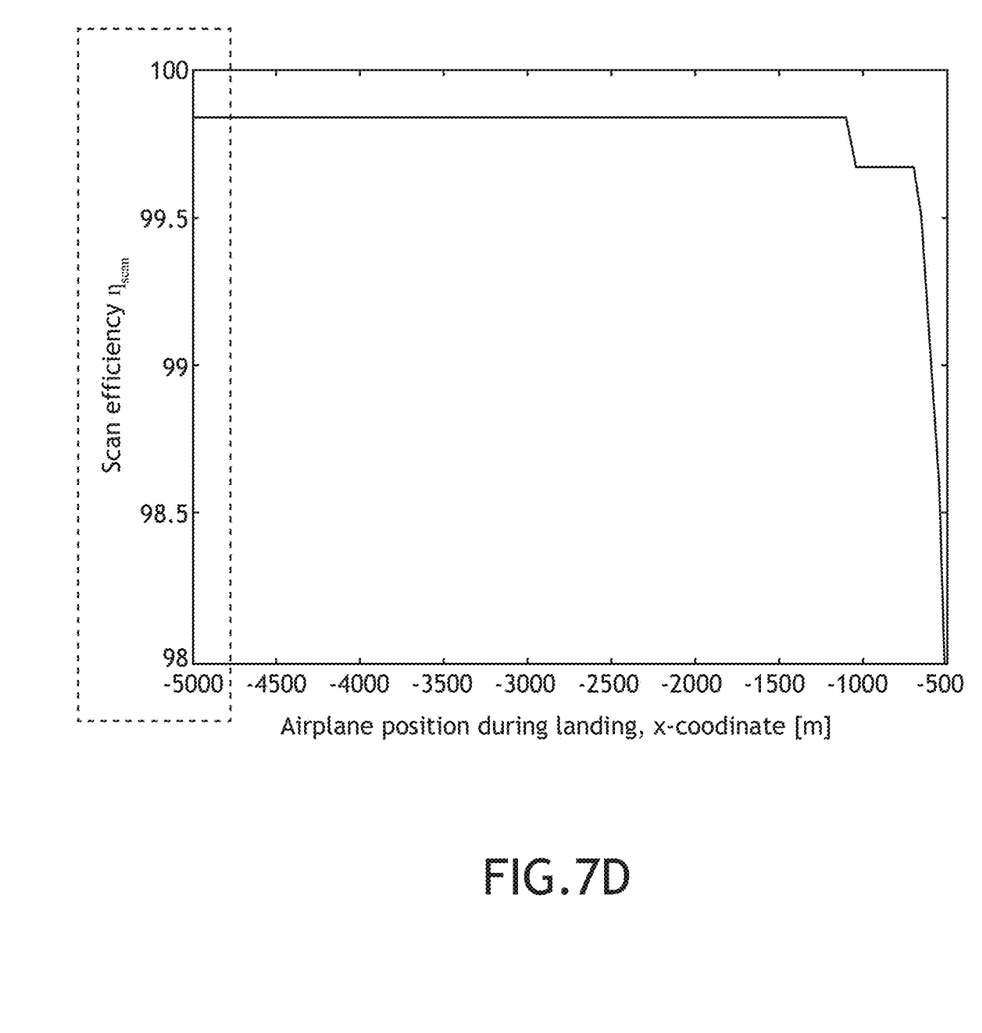

Referring now to FIGS. 7A, 7B, 7C, and 7D an exemplary embodiment showing an exemplary adaptive beam scanning benefit for an example scenario where a landing aircraft is approaching a runway according to the inventive concepts disclosed herein is shown. The radar system 103 may image runway lights. The adaptive beam scanning may only scan where targets of interest (e.g., light barrettes) are present. FIG. 7A shows a position graph of targets of interest. FIGS. 7B and 7C show an aircraft orientation relative to a landing zone. FIG. 7D shows a graph of scan efficiency versus airplane position during landing. Theoretical beam scanning efficiency can be calculated as equal to 1 minus [(a minimal number of beam scans needed to identify targets) divided by (a number of beam scans for a full volumetric search)]. Theoretical beam scanning efficiency measures a percentage of saved time to identify a target using the same frame time. This example results in a 98% time reduction to identify the targets during an aligned landing.

In some embodiments, an adaptive beam-scanning approach presented herein reduces overall scan time by limiting the scan to only a small region of interest as determined by the tuning method 400.

In some embodiments, scan time reduction is not the main goal/benefit of the system. However, instead, by reducing the scan time for the region of interest (via context-based optimization of the radar parameters), more total scans can be conducted over that small region when compared to the broader (naively scanned) region, which can result in improved radar accuracy and resolution. By conducting more scans on a particular region of interest, more information can be acquired about that region which can be used to obtain a higher resolution image of the scene, a higher target identification probability, more reliable performance, and/or etc.

In some embodiments, the adaptive scanning approach does not necessarily seek to reduce the scan volume in all cases. If the region of interest is larger than (or falls outside of) the current scan range, the optimized scan volume may be increased/adjusted to include more areas of interest. This may increase scan time, but the main goal is to scan the targets of interest, which might not fully be achieved with a smaller scan.

Figure 8:
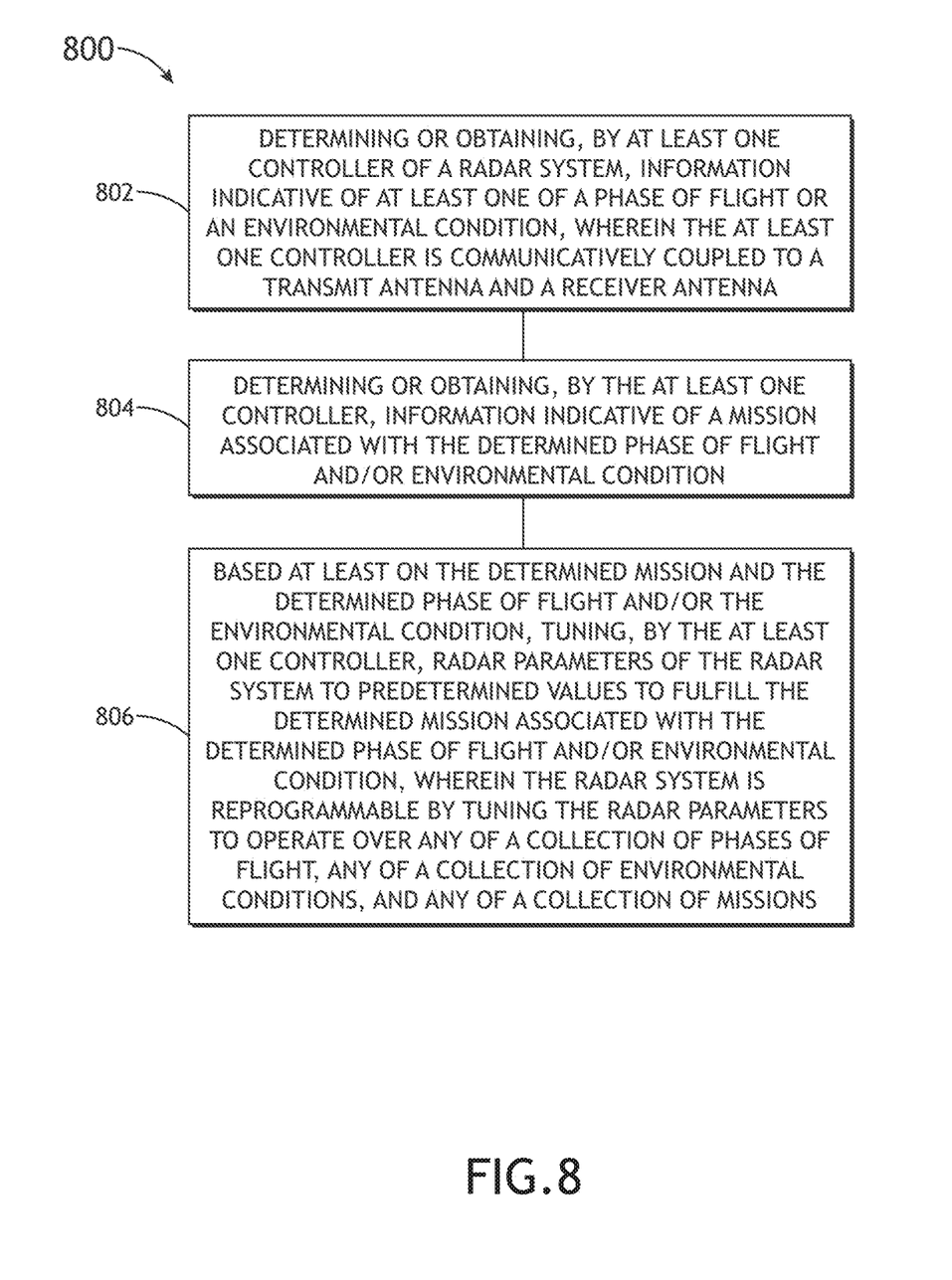
FIG. 8 is a diagram of an exemplary embodiment of a method according to the inventive concepts disclosed herein.

Referring now to FIG. 8, an exemplary embodiment of a method 800 according to the inventive concepts disclosed herein may include one or more of the following steps. Additionally, for example, some embodiments may include performing one or more instances of the method 800 iteratively, concurrently, and/or sequentially. Additionally, for example, at least some of the steps of the method 800 may be performed in parallel and/or concurrently. Additionally, in some embodiments, at least some of the steps of the method 800 may be performed non-sequentially.

A step 802 may include determining or obtaining, by at least one controller of a radar system, information indicative of at least one of a phase of flight or an environmental condition, wherein the at least one controller is communicatively coupled to a transmit antenna and a receive antenna.

A step 804 may include determining or obtaining, by the at least one controller, information indicative of a mission associated with the determined phase of flight and/or environmental condition.

A step 806 may include based at least on the determined mission and the determined phase of flight and/or the environmental condition, tuning, by the at least one controller, radar parameters of the radar system to values to fulfill the determined mission associated with the determined phase of flight and/or environmental condition, wherein the radar system is reprogrammable by tuning the radar parameters to operate over any of a collection of phases of flight, any of a collection of environmental conditions, and any of a collection of missions.

Further, the method 800 may include any of the operations disclosed throughout.

As will be appreciated from the above, embodiments of the inventive concepts disclosed herein may be directed to a method and a system (e.g., an aircraft system) including a radar system (e.g., a software-defined radar system) that is reprogrammable by tuning radar parameters to operate over any of a collection of phases of flight, any of a collection of environmental conditions, and any of a collection of missions.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising: a radar system, comprising: a transmit antenna; a receive antenna; and at least one controller communicatively coupled to the transmit antenna and the receive antenna, wherein the at least one controller is configured to: determine or obtain information indicative of at least one of a phase of flight or an environmental condition; determine or obtain information indicative of a mission associated with the determined phase of flight and/or environmental condition; and based at least on the determined mission and the determined phase of flight and/or the environmental condition, tune radar parameters of the radar system to values to fulfill the determined mission associated with the determined phase of flight and/or environmental condition, wherein the radar system is reprogrammable by tuning the radar parameters to operate over collection of phases of flight, collection of environmental conditions, and collection of missions, and wherein the radar system is reprogrammable to adaptively adjust, in real time, from a first radar programmed state to a second radar programmed state to meet different radar parameter requirements associated with the collection of phases of flight, the collection of environmental conditions, or collection of missions.

2. The system of claim 1, wherein the radar system is reprogrammable to operate as a continuous-wave (CW) radar in the first radar programmed state and to operate as a pulsed radar in the second radar programmed state.

3. The system of claim 2, wherein the radar system is reprogrammable to operate as a frequency-modulated continuous-wave (FMCW) radar in the first radar programmed state and to operate as the pulsed radar in the second radar programmed state.

4. The system of claim 1, wherein the radar parameters include at least one of chirp bandwidth, chirp period, analog-to-digital (ADC) converter sampling frequency, at least one transmitted power, chirp central frequency, number of chirps in a frame, frame time, field of regard (FOR) in elevation, or FOR in azimuth.

5. The system of claim 4, wherein the radar parameters include the chirp bandwidth, the chirp period, the analog-to-digital (ADC) converter sampling frequency, the at least one transmitted power, the chirp central frequency, the number of chirps in the frame, the frame time, the field of regard (FOR) in elevation, and the FOR in azimuth.

6. The system of claim 1, wherein the collection of phases of flight includes at least two of a landing phase, a taxi phase, or a take-off phase.

7. The system of claim 6, wherein the collection of phases of flight includes the landing phase, wherein the determined phase of flight and/or environmental condition comprises the landing phase, wherein the collection of missions includes radar imaging, landing zone alignment, and detect and avoidance (DAA), wherein the determined mission further comprises the radar imaging, the landing zone alignment, or the detect and avoidance (DAA).

8. The system of claim 7, wherein the radar system is reprogrammed by tuning the radar parameters to operate over a subsequent determined phase of flight and/or environmental condition, the subsequent determined phase of flight and/or environmental condition being different from the determined phase of flight and/or environmental condition.

9. The system of claim 7, wherein the determined mission comprises the radar imaging,
wherein the radar system is reprogrammed by tuning the radar parameters to operate over a first subsequent determined mission, the first subsequent determined mission comprising the landing zone alignment,
wherein the radar system is reprogrammed by tuning the radar parameters to operate over a second subsequent determined mission, the second subsequent determined mission comprising the DAA,
wherein the radar system is reprogrammed by tuning the radar parameters to operate over a subsequent determined phase of flight and/or environmental condition, wherein the subsequent determined phase of flight and/or environmental condition comprises the taxi phase,
wherein the radar system is reprogrammed by tuning the radar parameters to operate over a third subsequent determined mission, the third subsequent determined mission comprising taxiway clearance,
wherein the radar system is reprogrammed by tuning the radar parameters to operate over a second subsequent determined phase of flight and/or environmental condition, wherein the second subsequent determined phase of flight and/or environmental condition comprises the take-off phase,
wherein the radar system is reprogrammed by tuning the radar parameters to operate over a fourth subsequent determined mission, the fourth subsequent determined mission comprising the DAA.

10. The system of claim 6, wherein the collection of phases of flight includes the taxi phase, wherein the determined phase of flight and/or environmental condition comprises the taxi phase, wherein the collection of missions includes taxiway clearance, wherein the determined mission further comprises the taxiway clearance.

11. The system of claim 10, wherein the radar system is reprogrammed by tuning the radar parameters to operate over a subsequent determined phase of flight and/or environmental condition, the subsequent determined phase of flight and/or environmental condition being different from the determined phase of flight and/or environmental condition.

12. The system of claim 6, wherein the collection of phases of flight includes the take-off phase, wherein the determined phase of flight and/or environmental condition comprises the take-off phase, wherein the collection of missions includes taxiway clearance and detect and avoidance (DAA), wherein the determined mission further comprises the taxiway clearance or the detect and avoidance (DAA).

13. The system of claim 12, wherein the radar system is reprogrammed by tuning the radar parameters to operate over a subsequent determined phase of flight and/or environmental condition, the subsequent determined phase of flight and/or environmental condition being different from the determined phase of flight and/or environmental condition.

14. The system of claim 6, wherein the collection of environmental conditions comprises at least two of rain, snow, sleet, fog, hail, lightning, dust, sand, or terrain topology.

15. A method, comprising: determining or obtaining, by at least one controller of a radar system, information indicative of at least one of a phase of flight or an environmental condition, wherein the at least one controller is communicatively coupled to a transmit antenna and a receive antenna; determining or obtaining, by the at least one controller, information indicative of a mission associated with the determined phase of flight and/or environmental condition; and based at least on the determined mission and the determined phase of flight and/or the environmental condition, tuning, by the at least one controller, radar parameters of the radar system to values to fulfill the determined mission associated with the determined phase of flight and/or environmental condition, wherein the radar system is reprogrammable by tuning the radar parameters to operate over collection of phases of flight, collection of environmental conditions, and collection of missions; and adaptively adjusting the radar system, in real time, from a first radar programmed state to a second radar programmed state to meet different radar parameter requirements associated with the collection of phases of flight, the collection of environmental conditions, or the collection of missions.

* * * * *